United States Patent
Bäuerle

[11] Patent Number: 5,913,746
[45] Date of Patent: Jun. 22, 1999

[54] SYSTEM FOR ADJUSTING THE GEAR RATIO OF A CONTINUOUSLY VARIABLE TRANSMISSION

[75] Inventor: Peter Bäuerle, Ludwigsburg, Germany

[73] Assignee: Robert Bosch GmbH, Stuttgart, Germany

[21] Appl. No.: 08/822,583

[22] Filed: Mar. 20, 1997

[30] Foreign Application Priority Data

Mar. 20, 1996 [DE] Germany .................. 196 10 950

[51] Int. Cl.$^6$ .................. F16H 59/66; B60K 41/12
[52] U.S. Cl. .................. 477/47; 477/118; 477/901
[58] Field of Search .................. 477/46, 47, 97, 477/110, 115, 118, 120, 901, 904; 701/65

[56] References Cited

U.S. PATENT DOCUMENTS

| | | | |
|---|---|---|---|
| 4,895,054 | 1/1990 | Rauneker et al. | 477/47 X |
| 4,911,275 | 3/1990 | Ohkumo et al. | 477/47 X |
| 4,976,170 | 12/1990 | Hayashi et al. | 477/47 X |
| 5,025,685 | 6/1991 | Kobayashi et al. | 477/97 |
| 5,214,983 | 6/1993 | Kobayashi et al. | 477/44 X |
| 5,282,400 | 2/1994 | Kobayashi et al. | 477/37 |
| 5,474,505 | 12/1995 | Seidel et al. | 477/47 X |
| 5,514,050 | 5/1996 | Bäuerle et al. | |
| 5,716,301 | 2/1998 | Wild et al. | 477/97 |

FOREIGN PATENT DOCUMENTS 0451887 10/1991 European Pat. Off. .

*Primary Examiner*—Dirk Wright
*Assistant Examiner*—Peter T. Kwon
*Attorney, Agent, or Firm*—Walter Ottesen

[57] ABSTRACT

A system for adjusting the gear ratio of a transmission is continuously adjusted with respect to its gear ratio and mounted downstream of the vehicle motor. Furthermore, downhill travel is detected and the adjustment of the gear ratio of the transmission is made in dependence upon the detected downhill travel. The system is are provided for adjusting the gear ratio in reaction to the detected downhill travel in such a manner that the transmission input rpm and/or the engine rpm increases in a pregiven manner. The advantage of the system is that the transition from normal operation (no downhill travel) to the downhill travel function of the system takes place at first unnoticeable for the driver because the engine rpm increases in a manner not unexpected for the driver.

5 Claims, 5 Drawing Sheets

SYSTEM FOR ADJUSTING THE GEAR RATIO OF A CONTINUOUSLY VARIABLE TRANSMISSION

BACKGROUND OF THE INVENTION

Continuously variable transmissions and their control are described, for example, in European patent publication 0,451,887 and in U.S. Pat. No. 5,514,050. U.S. Pat. No. 5,514,050 describes the adjustment of the gear ratio in such a continuously variable transmission. In this context, the downhill travel of the vehicle is detected and the adjusting strategy is modified during a detected downhill travel. It is especially here provided that the driving state of downhill travel is determined and the road speed is detected and stored at the time point of the start of the downhill travel. The transmission is then continuously adjusted so that the determined speed is essentially maintained while utilizing the braking action of the motor.

As a rule, the internal combustion engine of a vehicle is operated at relatively low rpm in order to exploit the consumption advantages of a vehicle equipped with a continuously variable transmission. A precondition for this is a low transmission gear ratio close to a so-called overdrive. As a consequence of this low engine rpm, the engine braking action is slight during downhill travel and especially in overrun operation.

SUMMARY OF THE INVENTION

It is an object of the invention to configure the gear ratio adjustments in reaction to a detected downhill travel of the vehicle in a simple manner and in a manner comfortable for the driver.

The system of the invention is for adjusting the gear ratio of a transmission wherein the gear ratio can be adjusted continuously. The transmission is mounted downstream of the engine of the motor vehicle and the system includes: means for detecting downhill travel of the vehicle; and, means for adjusting the gear ratio ($I_{des}$) of the transmission in response to a detection of the downhill travel in such a manner that at least one of the transmission input rpm and the engine rpm increases in a pregiven manner.

As mentioned, the invention proceeds from a system for adjusting the gear ratio of a continuously variable transmission. The transmission is mounted downstream of the engine of the vehicle. Furthermore, downhill travel is detected and the adjustment of the gear ratio of the transmission is made in dependence upon the detected downhill travel. The essence of the invention is that means are provided with which the adjustments of gear ratio in reaction to a detected downhill travel are made in such a manner that the transmission input rpm and/or engine rpm increases in a manner which can be pregiven. The advantage of the invention comprises especially that the transition from normal operation (no downhill travel) to a downhill travel function in accordance with the invention is, at first, unnoticeable for the driver because the engine rpm increases in a manner which is not unexpected to the driver. In contrast to the method described in U.S. Pat. No. 5,514,050 (wherein the vehicle longitudinal speed is intended to be held essentially constant during downhill travel), the system of the invention permits a limited increase in road speed especially at the start of the downhill travel. Compared to the method of U.S. Pat. No. 5,514,050, the present invention provides most importantly an increase in the engine rpm because this increase is directly realized by the driver. The invention offers the greatest possibility with respect to applications for the comfortable transition from normal operation to downhill operation without surrendering the desired braking action of the engine during such downhill travel.

In an advantageous embodiment of the invention, the increase of the transmission rpm and/or the engine rpm is permanently pregiven. In this embodiment, a desired increase characteristic for the engine rpm or for the transmission input rpm can be pregiven. In this context, especially a progressive characteristic in the form of a quadratic equation or of an exponential function is considered.

In an especially advantageous embodiment of the invention, the increase of the transmission input rpm and/or the engine rpm is pregiven in dependence upon an operating state of the vehicle which is present when downhill travel is detected. This configuration of the invention is to be viewed in the context that a downhill travel can occur in the presence of relatively different operating states of the vehicle. With this embodiment of the invention, the increase of the transmission input rpm and/or the engine rpm can be adapted in an advantageous manner to these different operating states at the start of downhill travel.

Especially in the last-mentioned embodiment of the invention, it is provided that the increase of the transmission input rpm and/or engine rpm is pregiven in dependence upon the transmission input rpm and/or the engine rpm which is present at the start of a detected downhill travel. This embodiment is to be viewed in the context that, with the system of the invention, the transition from normal operation to downhill travel operation takes place with almost no engine rpm increase which is unexpected for the driver. The vehicle road speed can still increase in a limited manner during the downhill travel and especially at the start of the downhill travel. This possible road speed increase can be dependent upon the transmission initial rpm or on the vehicle longitudinal road speed. For stretches of roadway where there is a steep drop and during which the vehicle, as a rule, is driven more slowly, the engine rpm, and therefore the engine overrun torque increases, more rapidly than, for example, for driving on the expressway where driving resistance is greater because of higher road speeds.

According to one embodiment of the invention, the increase of the transmission input rpm and/or the engine rpm is pregiven in such a manner that the increase takes place with a specific gradient. This gradient is determined in dependence upon the above-mentioned operating state of the vehicle which is present when the downhill travel is detected. This gradient can therefore be determined in dependence upon the transmission output rpm and/or in dependence upon the longitudinal road speed of the vehicle which is present when downhill travel is detected.

In order to realize the transmission input rpm and/or the engine rpm, which increases in accordance with the invention, sensor means for generating a rpm signal representing the transmission input rpm and/or the engine rpm can be provided and, the adjustment of the gear ratio can be made in reaction to a detected downhill travel in such a manner that the detected rpm signal increases in a manner which can be pregiven. The above-mentioned transmission output rpm or the longitudinal road speed of the vehicle can also be detected by sensor means. The instantaneously detected transmission output rpm or the longitudinal road speed of the vehicle is determined in reaction to a detected downhill travel whereupon the adjustment of the gear ratio is made in such a manner that the transmission input rpm signal or the engine rpm signal increases in a manner dependent upon the specific transmission output rpm or longitudinal road speed of the vehicle.

The detection of the downhill travel can take place in dependence upon a determined longitudinal acceleration of the vehicle and/or in dependence upon the detected position of the accelerator pedal actuated by the driver of the vehicle and/or on the detected throttle flap angle of the engine. The longitudinal acceleration of the vehicle can then be determined in an advantageous manner by differentiation from the detected transmission output rpm or from the detected longitudinal road speed of the vehicle. It is especially provided that a downhill travel is then detected when the longitudinal acceleration of the vehicle exceeds a specific limit value when there is a given position value of the accelerator pedal actuated by the driver and/or of the detected throttle flap angle. This position value is advantageously formed as a function of the detected transmission input rpm and/or the engine rpm and of the detected longitudinal road speed of the vehicle.

It is advantageously provided that the adjustment of the gear ratio outside of a downhill travel takes place at least in dependence upon the detected transmission output rpm and/or the detected longitudinal road speed of the vehicle as well as in dependence upon the detected position of the accelerator pedal actuated by the driver and/or on the detected throttle flap angle in accordance with a pregiven basic function. In reaction to a detected downhill travel, this basic function is modified or there is a movement out of this basic function in such a manner that the transmission input rpm and/or the engine rpm increases in a pregiven manner. The modification or the movement out of the basic function takes place as long as the downhill travel continues.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
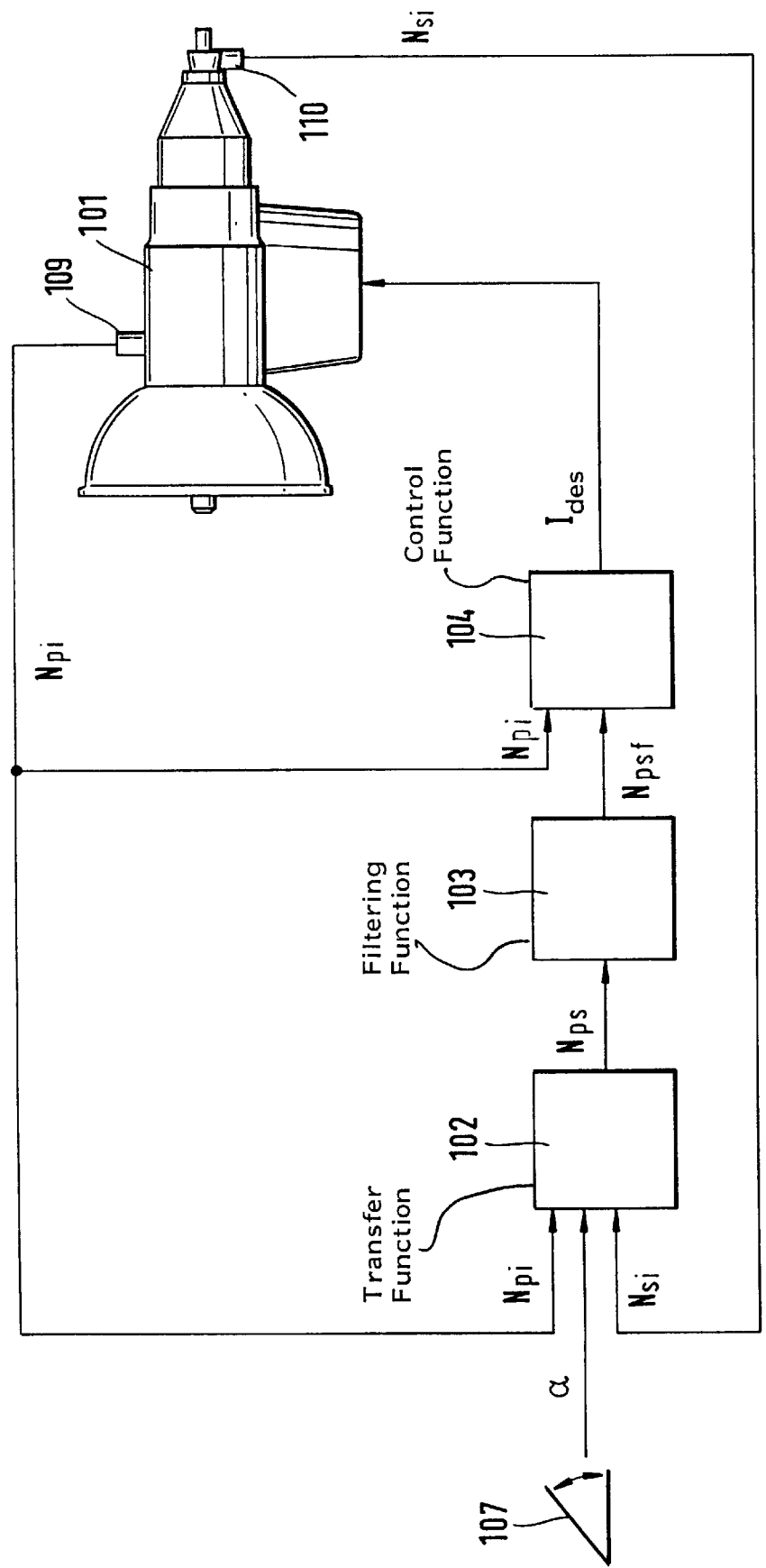
FIG. 1 is an overview block circuit diagram of an embodiment of the invention.

In FIG. 1, reference numeral 101 identifies a continuously variable transmission. Sensor 110 detects the output rpm $N_{si}$ of the transmission 101 and the sensor 109 detects the input rpm $N_{pi}$ thereof. The position α of the accelerator pedal 107 actuated by the driver is detected (sensor not shown). The transmission input rpm $N_{pi}$, the transmission output rpm $N_{si}$ as well as the position α of the accelerator pedal are all supplied to the function block 102.

At this point it is mentioned that, alternatively, other variables can be detected in lieu of the variables mentioned in this embodiment. Thus, in lieu of the accelerator pedal position α, the throttle flap angle of the vehicle engine can be utilized. The transmission input rpm $N_{pi}$ is, in the case of a continuously variable transmission, also referred to as the primary rpm (rpm of the primary tapered disc). As an alternative to the transmission input rpm, the engine rpm can be utilized while neglecting a converter slippage which may be present or under the condition of a fully engaged clutch.

In normal operation of the continuously variable transmission (that is, outside of the downhill travel operation of the invention), a desired value $N_{ps}$ for the transmission input rpm is determined from the measured accelerator pedal position α and the measured transmission output rpm $N_{si}$. This desired value $N_{ps}$ for the transmission input rpm is filtered in block 103 and supplied to the control block 104. In the control block 104, the filtered transmission input desired value $N_{psf}$ is compared to the instantaneous actual value $N_{pi}$ of the transmission input rpm whereupon, to adjust the desired value $N_{psf}$ the actuating quantity $I_{des}$ is correspondingly changed. The actuating quantity $I_{des}$ can, for example, define a drive current for an electrohydraulic control valve which changes the gear ratio of the transmission by injecting hydraulic liquid.

Figure 2:
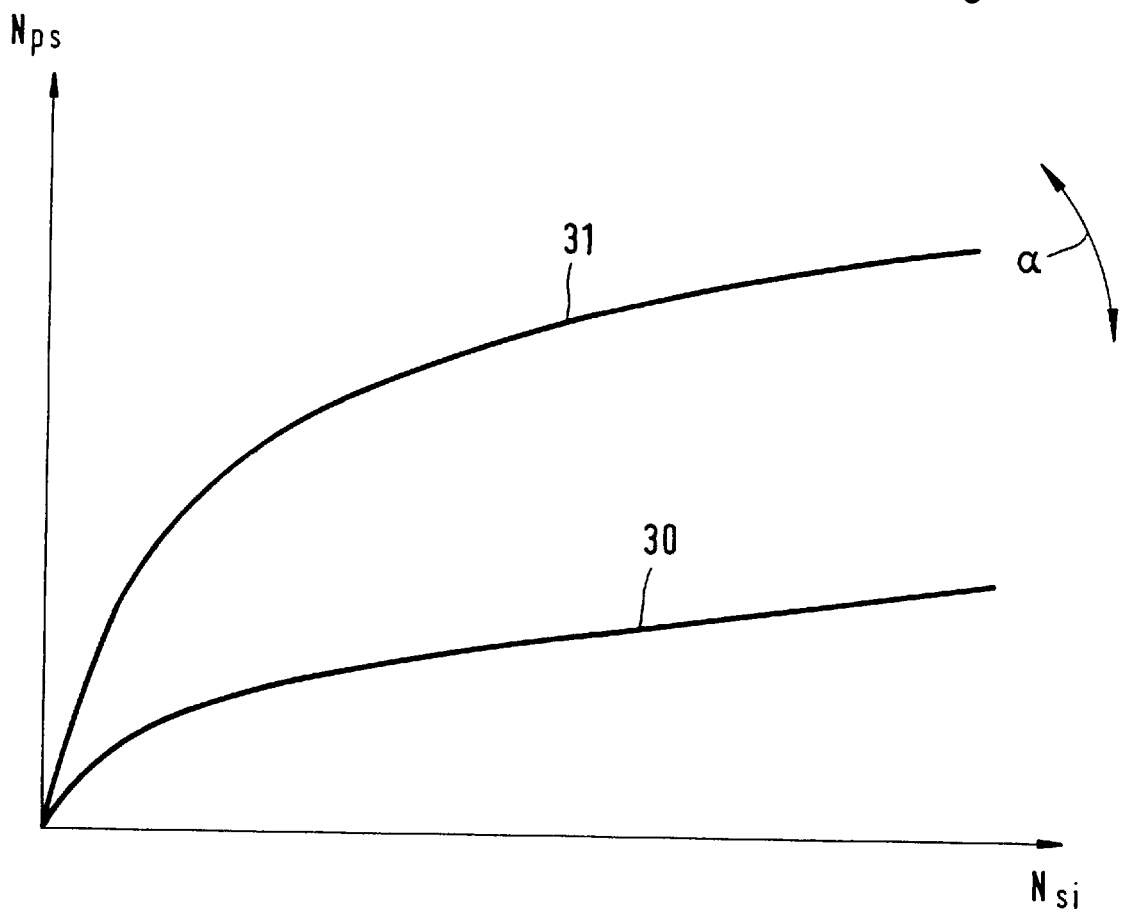
FIG. 2 shows a plot of the desired value $N_{ps}$ of the transmission input rpm as a function of the actual value $N_{si}$ of the transmission output rpm and provides a transmission gear ratio adjustment as a basic function.

FIG. 2 shows, as an example, a possible transfer characteristic of block 102. For this purpose, and in FIG. 2, the desired value $N_{ps}$ for the transmission input rpm is plotted as a function of the actual value $N_{si}$ of the transmission output rpm. Two traces, 30 and 31 are shown here as an example because the block 102 is a three-dimensional characteristic field. The trace 30 is realized for a fixed low accelerator pedal angle α; whereas, the trace 31 shows the trace for a larger accelerator pedal angle α.

Figure 3:
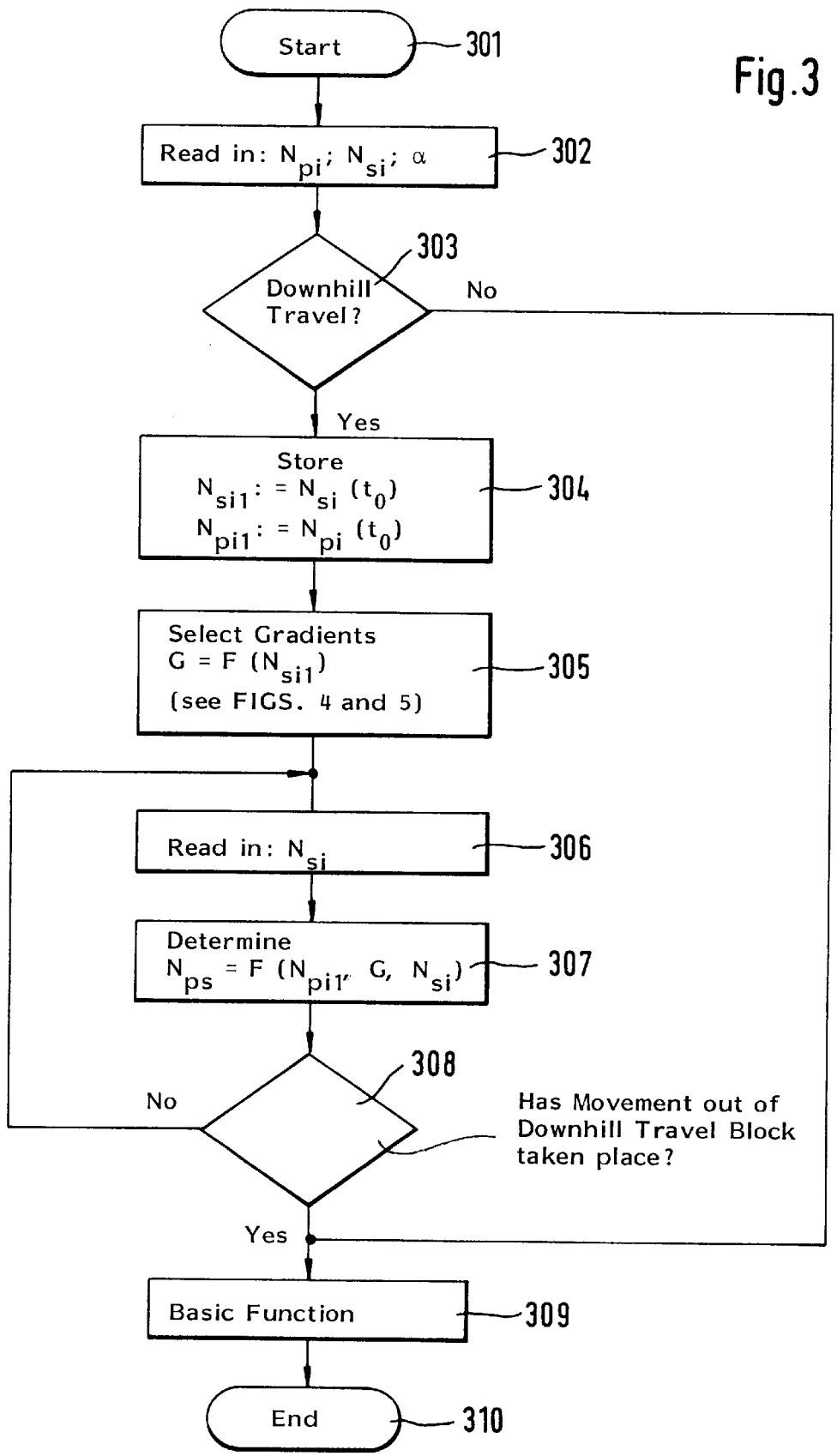
FIG. 3 is a flowchart showing the method steps carried out with the system of the invention.

In FIG. 3, the selection of the desired transmission input rpm $N_{ps}$, in accordance with FIG. 2 is shown with the block 309 as basic function. FIG. 3 shows the function of the block 102 with the downhill travel function according to the invention in the context of a flowchart. As mentioned, the basic function shown in FIG. 2 is effective in the normal case. After the start step 301, the actual values for each of the transmission input rpm $N_{pi}$, the transmission output rpm $N_{si}$ and the accelerator pedal angle α are all read in in step 302. In step 303, a check is made as to whether downhill travel is present or not. This downhill travel detection can, for example, take place in that a check is made as to whether the driving resistance characteristic line of the vehicle is exceeded. In addition, for checking as to whether the downhill travel is present, a check is made as to whether the vehicle acceleration exceeds a limit value for a given accelerator pedal position (for example, as a function of the engine rpm and road speed). The vehicle acceleration can then be determined by differentiating the transmission output rpm. Likewise, the engine rpm can be set equal to the transmission input rpm. If it is determined in step 303 that no downhill travel is present, then the described basic function is maintained with block 308.

However, if downhill travel is detected in step 303, then, in step 304 the instantaneously present value for the transmission output rpm $N_{si}(t_0)$ is stored as value $N_{si1}$ and the transmission input rpm $N_{pi}(t_0)$ is stored as value $N_{pi1}$. In step 305, the gradient G is selected as a function of the start secondary rpm $N_{si1}$. In the next step 307, the desired value $N_{ps}$ is determined as a function of the start primary rpm $N_{pi1}$, of the gradient G and of the actual secondary rpm $N_{si}$ (step 306). The primary rpm $N_{ps}$ is made actual in accordance with FIGS. 4 and 5 until, in step 308, there is a movement out of the downhill travel and there is a switchover to the basic function 309. After step 310, the sequence shown in FIG. 3 is started anew.

Figure 4:
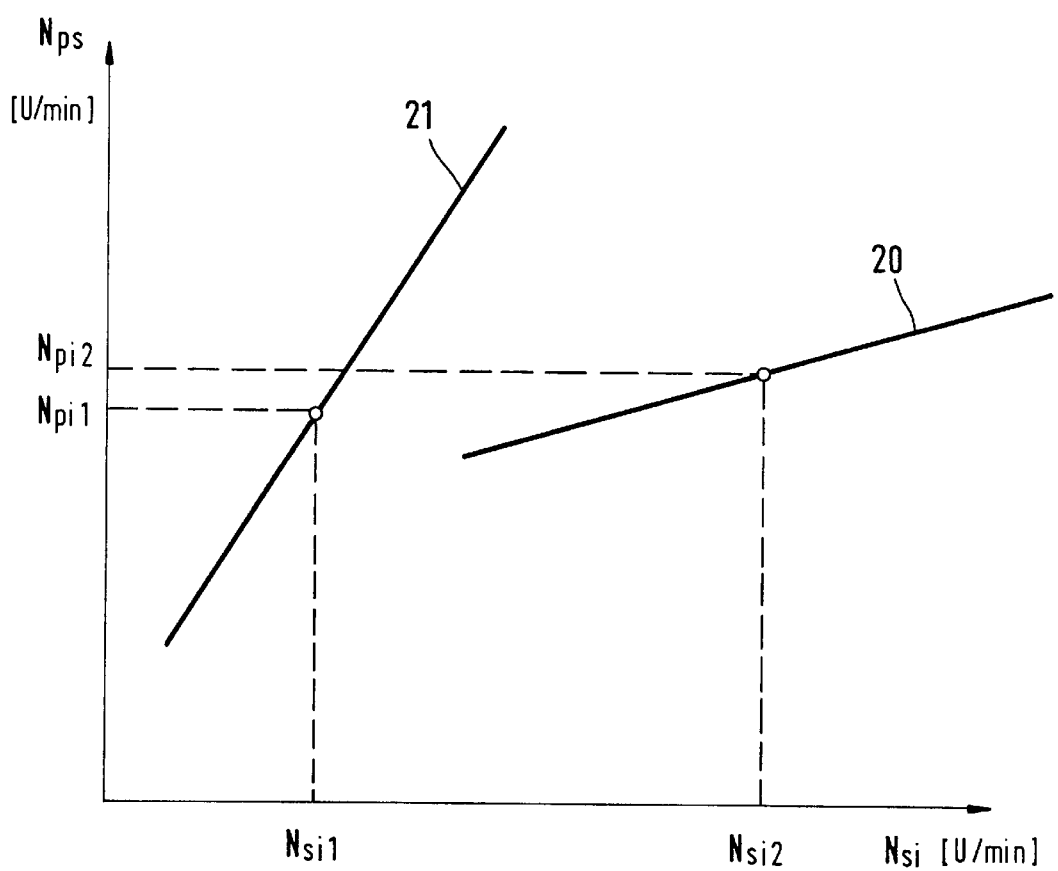
FIG. 4 shows an exemplary increase variation in the context of a plot of the desired transmission input rpm plotted against the actual value of the transmission output rpm; and, FIG. 5 shows another exemplary increase variation also in the context of a plot of the desired transmission input rpm plotted as a function of the actual transmission output rpm.

FIG. 4 shows the desired value $N_{ps}$ of the transmission input rpm as a function of actual value $N_{si}$ of the transmission output rpm. If, at the time point of the detection of the downhill travel, the transmission output rpm $N_{si1}$ is present (step 304), then and in accordance with this embodiment, the value $N_{pi1}$ of the transmission input rpm measured at this time point is increased with the slope, that is, with the gradient 21. If a higher value $N_{si2}$ of the transmission output rpm is present at the time point of the detection of downhill travel, then and in accordance with this embodiment, the gradient 20 with which the assigned transmission input rpm $N_{pi2}$ increases is selected lower. This dependency of the gradient or of the slope of the transmission output rpm (which is present with the detection of the downhill travel) is shown in block 307 (FIG. 3) with a functional relationship F.

According to this embodiment, the transmission output rpm is at first maintained for a detected downhill travel. If the vehicle speed or the transmission output rpm increases during downhill travel, then the transmission input desired rpm $N_{ps}$ increases in correspondence to characteristic line 21 (FIG. 4). With the increasing transmission input rpm or engine rpm, the overrun torque of the vehicle engine and therefore also the overrun force on the drive wheels increases until the sum of the overrun force (acting on the drive wheels), the driving resistance and the acceleration force is zero. In this way, a smooth increase of the engine rpm is obtained and the road speed during downhill operation does not increase incongruously because of the increase of the overrun torque.

As mentioned above, and as a variation of the embodiment, the increase or the gradient of the rpm increase of the transmission input rpm or engine rpm can be dependent upon the transmission output rpm or upon the longitudinal road speed of the vehicle at the time point of the detection of the downhill travel operation. For a low longitudinal road speed of the vehicle, and as mentioned, the engine rpm can increase with greater steepness in correspondence to the characteristic line 21; whereas, for higher transmission input start rpm, a flatter rpm increase is possible, for example, in correspondence to the characteristic line 20.

Figure 5:
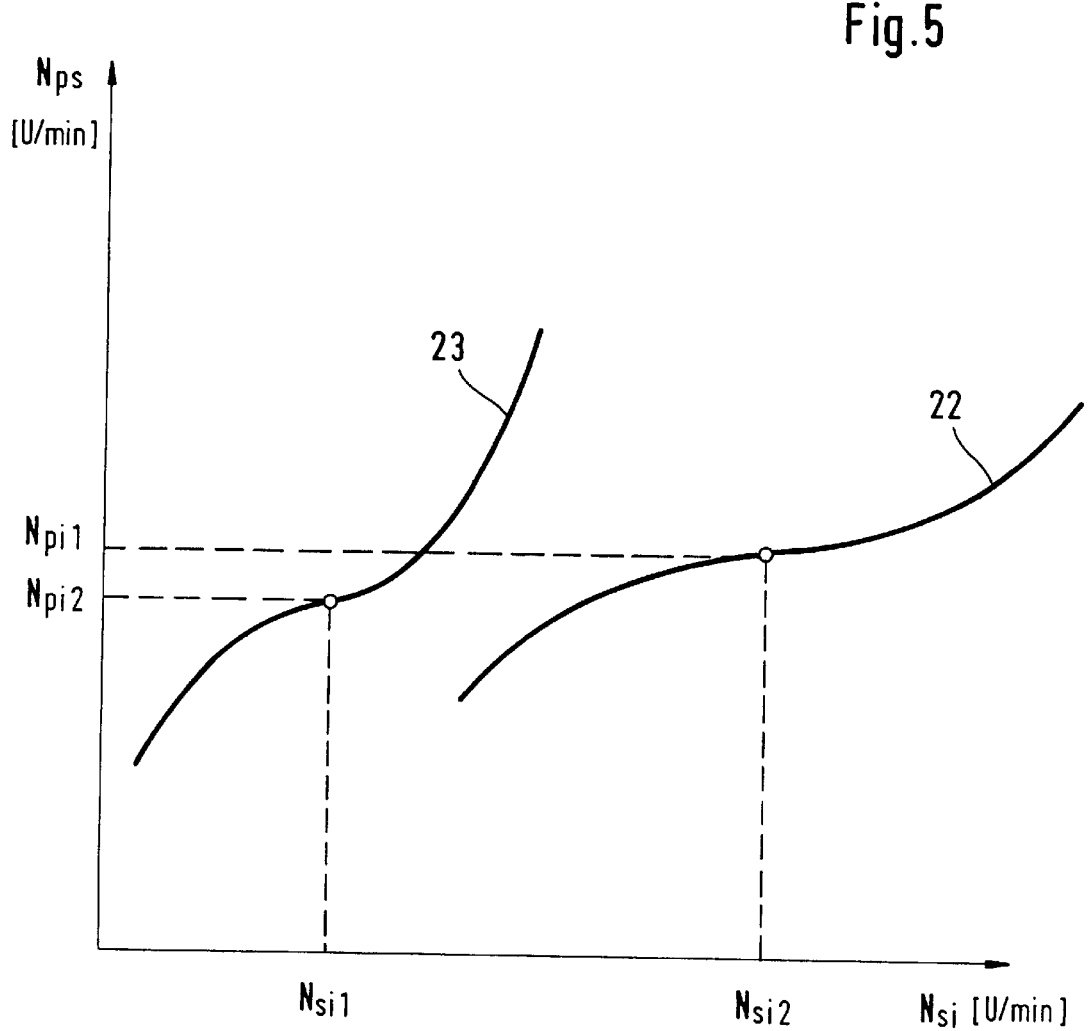

As a further variation, the trace of the transmission input rpm can exhibit any desired characteristic. For example, a progressive trace can be selected in the form of a quadratic equation or of an exponential function as shown in FIG. 5 with characteristic lines 23 and 22.

Furthermore, the increase of the transmission input desired rpm or the engine desired rpm can also be dependent upon the transmission input rpm or the engine rpm at the time point of the detection of the downhill travel operation.

Leaving the function "downhill travel" and the transition to the basic function connected thereto is possible if the accelerator pedal position or the throttle flap angle exceeds a limit value, for example, as a function of engine rpm and road speed.

It is understood that the foregoing description is that of the preferred embodiments of the invention and that various changes and modifications may be made thereto without departing from the spirit and scope of the invention as defined in the appended claims.

What is claimed is:

1. A system for adjusting the gear ratio of a transmission wherein the gear ratio can be adjusted continuously, the transmission being mounted downstream of the engine of the motor vehicle, the system comprising:

means for detecting downhill travel of the vehicle;

means for adjusting the gear ratio ($I_{des}$) of said transmission in response to a detection of said downhill travel in such a manner that at least one of the transmission input rpm and the engine rpm increases in a pregiven manner;

the increase of at least one of said transmission input rpm and said engine rpm being pregiven, when downhill travel is detected, in dependence upon at least one of the following the transmission output rpm, the vehicle longitudinal road speed, the transmission input rpm and the engine rpm.

2. The system of claim 1, wherein the increase of at least one of the transmission input rpm and the engine rpm is pregiven in such a manner that the increase takes place with a specific gradient (G); and, when said downhill travel is detected, said gradient (G) is determined in dependence upon at least one of the following the transmission output rpm, the longitudinal road speed of vehicle, the transmission input rpm and the engine rpm.

3. A system for adjusting the gear ratio of a transmission wherein the gear ratio can be adjusted continuously, the transmission being mounted downstream of the engine of the motor vehicle, the system comprising:

means for detecting downhill travel of the vehicle;

means for adjusting the gear ratio ($I_{des}$) of said transmission in response to a detection of said downhill travel in such a manner that at least one of the transmission input rpm and the engine rpm increases in a pregiven manner;

first sensor means for generating a first rpm signal ($N_{pi}$) representing at least one of said transmission input rpm and said engine rpm;

second sensor means for generating a second rpm signal ($N_{si}$) representing one of the transmission output rpm and the longitudinal road speed of the vehicle;

means for responding to the detected downhill travel by determining at least one of an instantaneously generated first rpm quantity ($N_{pi1}$, $N_{pi2}$) and an instantaneously generated second rpm quantity ($N_{si1}$, $N_{si2}$); and, means for effecting the adjustment of said gear ratio in such a manner that the detected first rpm signal ($N_{pi}$) increases in a manner dependent upon at least one of said specific first rpm quantity ($N_{pi1}$, $N_{pi2}$) and said second rpm quantity ($N_{si1}$, $N_{si2}$).

4. A system for adjusting the gear ratio of a transmission wherein the gear ratio can be adjusted continuously, the transmission being mounted downstream of the engine of the motor vehicle, the system comprising:

means for detecting downhill travel of the vehicle;

means for adjusting the gear ratio ($I_{des}$) of said transmission in response to a detection of said downhill travel in such a manner that at least one of the transmission input rpm and the engine rpm increases in a pregiven manner;

the detection of said downhill travel being performed dependent upon at least one of the following: the determined longitudinal acceleration ($N_{si}'$) of the vehicle, the detected position ($\alpha$) of the accelerator pedal actuated by the driver of the vehicle and the detected angle of the throttle flap;

said downhill travel being detected when said determined longitudinal acceleration ($N_{si}'$) of the vehicle exceeds a specific limit value for at least one of a given position value of the accelerator pedal position and the detected throttle flap angle; and, said position value is formed as a function of at least one of the following: the detected transmission input rpm and the detected engine rpm as well as a function of the detected longitudinal speed of the vehicle.

5. A system for adjusting the gear ratio of a transmission wherein the gear ratio can be adjusted continuously, the transmission being mounted downstream of the engine of the motor vehicle, the system comprising:

means for detecting downhill travel of the vehicle;

means for adjusting the gear ratio ($I_{des}$) of said transmission in response to a detection of said downhill travel in such a manner that at least one of the transmission input rpm and the engine rpm increases in a pregiven manner;

the adjustment ($I_{des}$) of the gear ratio outside of downhill travel being effected in accordance with a pregiven basic function in dependence upon at least one of the detected transmission output rpm ($N_{si}$), the longitudinal speed of the vehicle as well as in dependence upon at least one of the detected position ($\alpha$) of the accelerator pedal actuated by the driver of the vehicle and the detected throttle flap angle;

said basic function being modified or there is a movement out of said basic function in response to a detected downhill travel so that at least one of the transmission input rpm and said engine rpm increases in a pregiven manner; and, the adjustment defining an adjusting quantity ($I_{des}$) in the form of a drive current for an electrohydraulic control valve which changes gear ratio of the transmission by injecting hydraulic liquid.

* * * * *